(12) United States Patent
Arrance et al.

(10) Patent No.: US 8,458,700 B1
(45) Date of Patent: Jun. 4, 2013

(54) PROVISIONING VIRTUAL MACHINES

(75) Inventors: Jonathan Paul Arrance, Cary, NC (US); Michael M. Latif, IV, Apex, NC (US)

(73) Assignee: NetApp, Inc., Sunnyvale, CA (US)

( * ) Notice: Subject to any disclaimer, the term of this patent is extended or adjusted under 35 U.S.C. 154(b) by 187 days.

(21) Appl. No.: 12/962,184

(22) Filed: Dec. 7, 2010

(51) Int. Cl.
*G06F 9/455* (2006.01)

(52) U.S. Cl.
USPC .............................................. 718/1

(58) Field of Classification Search
None
See application file for complete search history.

(56) References Cited

U.S. PATENT DOCUMENTS

| | | | |
|---|---|---|---|
| 6,999,185 B1 * | 2/2006 | Salgado | 358/1.12 |
| 7,610,631 B2 * | 10/2009 | Frank et al. | 726/30 |
| 7,954,098 B1 * | 5/2011 | Martin et al. | 717/176 |
| 8,005,991 B2 * | 8/2011 | Lo et al. | 709/248 |
| 2006/0092464 A1 * | 5/2006 | Ataka | 358/1.15 |
| 2007/0250833 A1 * | 10/2007 | Araujo et al. | 718/1 |
| 2010/0058332 A1 * | 3/2010 | DeHaan | 717/177 |
| 2010/0223368 A1 * | 9/2010 | Runcie et al. | 709/222 |
| 2010/0313200 A1 * | 12/2010 | Rozee et al. | 718/1 |
| 2012/0110574 A1 * | 5/2012 | Kumar | 718/1 |

OTHER PUBLICATIONS

"Performance Characteristics of VMFS and RDM", (Dec. 7, 2007), p. 2 [retrieved from www.vmware.com/files/pdf/vmfs_rdm_perf.pdf], pp. 1-11.*

* cited by examiner

*Primary Examiner* — Meng An
*Assistant Examiner* — James J Lee
(74) *Attorney, Agent, or Firm* — Cooper Legal Group, LLC

(57) ABSTRACT

Generating, configuring, and deploying virtual machines may be a time consuming and mundane process. Accordingly, one or more techniques and/or systems are disclosed for provisioning virtual machines through an automated process. In particular, a centralized manager may receive requests to initialize virtual machines on target hosts. The centralized manager may generate provisioning jobs based upon such requests. Because the virtual machines may initially have generic configurations so that the virtual machines are not tied to particular target hosts and/or subnets, the centralized manager may retrieve virtual machine personalities for the virtual machines. The centralized manager may send provisioning jobs to provisioning virtual applications located throughout a network computing environment. A provisioning job may instruct a provisioning virtual application to initialize a virtual machine on a target host using a virtual machine personality. In this way, a plurality of virtual machines may be generated through a distributed and automated process.

20 Claims, 11 Drawing Sheets

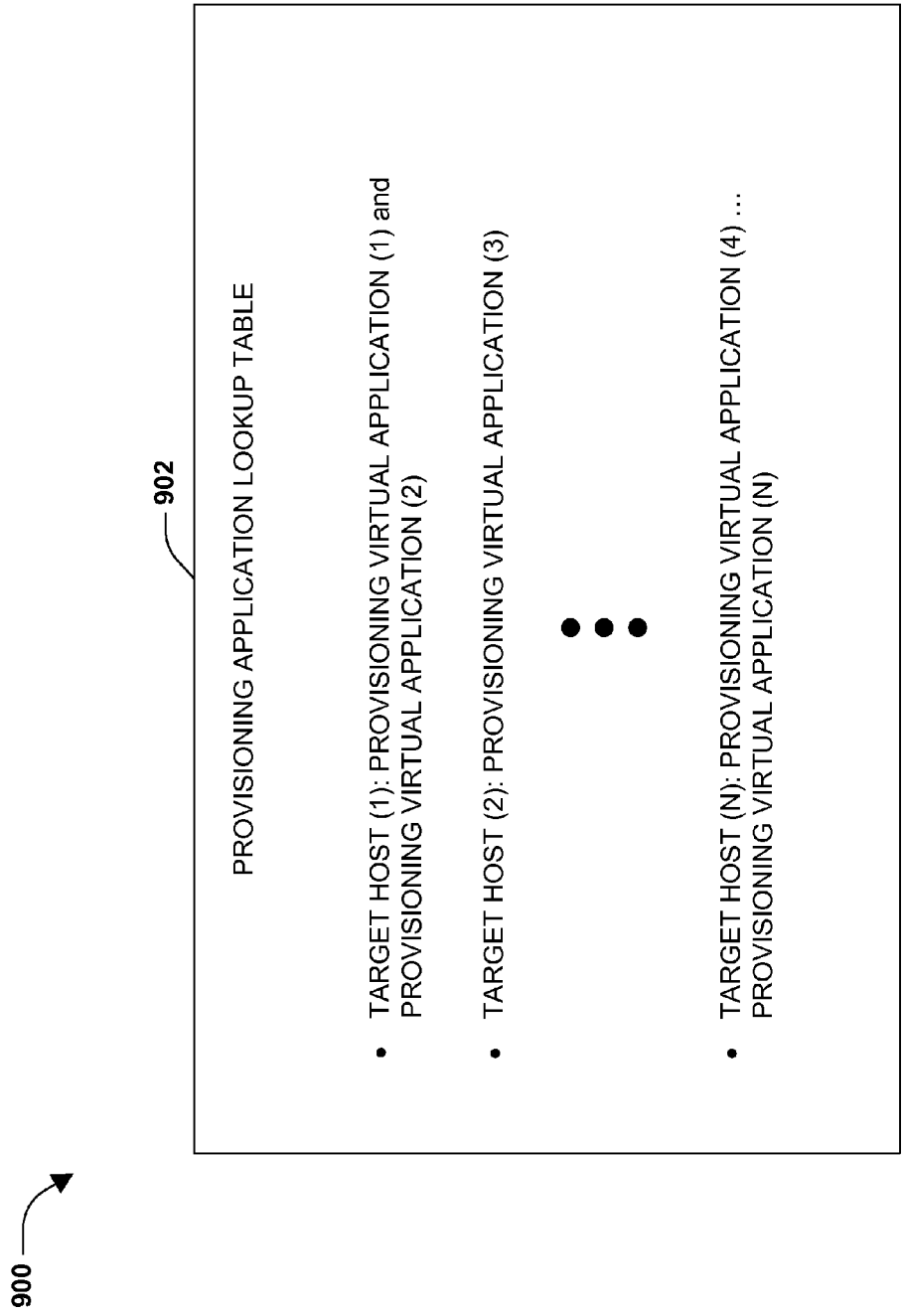

PROVISIONING VIRTUAL MACHINES

FIELD

The instant disclosure pertains to provisioning one or more virtual machines within a computing environment.

BACKGROUND

Many business entities and consumers are developing, testing, and consuming software applications and/or system configurations using virtual computing environments, such as virtual machines (VMs). A virtual machine provides a self-contained computing environment that may execute on a controller, such as one or more servers and/or desktop computing devices. The virtual machine may comprise its own operating system and one or more applications that are separate from the native operating environment of the controller. In this way, a virtual machine may execute on the controller without affecting the native operating environment of the controller (and/or other VMs executing on the controller). For example, a software developer may deploy and test a software product within one or more virtual machines executing on a host controller. The respective virtual machines may have similar or different software configurations (e.g., different operating systems, different software applications, etc.), which may be based upon the type of testing being performed. Events occurring at one of the virtual machines (e.g., installation or removal of a software application, a virtual computing environment crash, configuration changes to the virtual operating system and/or applications, etc.) may not affect the other virtual machines and/or the native operating environment of the host controller. In this way, the software product may be tested within a variety of virtual computing environments without affecting the native operating environment of the controller.

In one example, a virtual server environment may comprise multiple physical controllers, such as servers, that access a distributed data storage and management system. Respective controllers may comprise a plurality of virtual machines that reside and execute on one or more of the respective controllers. A virtual machine may comprise one or more applications and its own operating system and functions as a self-contained computing environment. Virtual machines on a controller may be configured to share hardware resources of the controller, and if connected to a distributed data storage and management system (cluster), share hardware resources of the cluster. A virtual machine monitor module/engine (hypervisor) may be used to manage the virtual machines on respective controllers, and also virtualize hardware and/or software resources of the controllers in the cluster for use by the virtual machines. Clients may be connected to the cluster to interface/interact with a particular virtual machine, to experience an emulated desktop environment, such as a virtual desktop environment, on the client machine. From the viewpoint of a client, the virtual machine may comprise a virtual desktop, or server that appears as an actual desktop machine environment or physical server.

In one example of a virtual computing environment, and making use thereof, a software development team may have developed a software system for a customer's factory that produces cars. The software development team may desire a test environment that mimics the customer's computing environment, with which to test the software system. In order to setup the test environment, a plurality of virtual machines mimicking the customer's computing devices in the factory may be created (e.g., 10 or more virtual machines). For example, the test environment may comprise virtual machines mimicking database servers, web servers, lab computing devices, factory machine computing devices, and/or other computing devices having particular configurations and/or software setup. In this way, the software development team may initialize, test, modify, remove, and/or reinitialize one or more virtual machines in the test environment without affecting the customer's actual computing environment and/or other VMs. It can thus be appreciated that it may be advantageous to use virtual machines within the test environment because if something goes wrong (e.g., an unrecoverable crash) or undesired modifications are made to a virtual machine (e.g., desired programming code is accidentally overwritten), then the virtual machine may be torn down (removed) and a fresh copy of the virtual machine may be reinitialized without adversely affecting other operations.

Unfortunately, deploying such a large number of virtual machines may be a time consuming and mundane task, which may require extensive manual intervention to deploy. In one example of manual actions taken to initialize merely a single virtual machine, a user may first create the virtual machine. Next, the user may boot the virtual machine and assign either a disk or an ISO image. Then, the user may install an operating system and/or desired software on the virtual machine, which may take hours. Additionally, the user may have to know particular information of a controller that is to host the virtual machine (e.g., IP address and/or other configuration data used to configure the virtual machine to execute on the controller). Such actions may need to be repeated time and again to instantiate respective VMs. In this way, it may take many man hours (e.g., days) for a user to setup one or more virtual machines.

SUMMARY

This disclosure relates to one or more techniques and/or systems that provide for provisioning virtual machines. In particular, provisioning virtual applications distributed within a network computing environment (e.g., a clustered network environment) may initialize virtual machines on target hosts (e.g., a controller, a server, a personal computer, and/or other computer devices) within the network computing environment based upon provisioning jobs received from a centralized component. Otherwise cumbersome processing for the centralized component may be distributed from the centralized component to provisioning virtual applications to disperse the processing throughout the network computing environment.

The network computing environment may comprise a plurality of target hosts that may be configured to execute virtual machines. For example, a target host may be capable of executing one or more virtual machines (e.g., raw device mapping (RDM) type virtual machines, virtual machine file system (VMFS) type virtual machines, and/or other types of virtual machines). Currently, virtual machines may be manually deployed on target hosts by a time consuming and mundane process. Manual user tasks to deploy a virtual machine may comprise creating the virtual machine, booting the virtual machine, assigning a disk or ISO to the virtual machine, installing an operating system and/or desired software on the virtual machine, and/or performing other configuration.

Accordingly, the one or more techniques and/or systems described herein provide for an automated process that distributes the initialization of virtual machines to provisioning virtual applications located throughout a network computing environment. In particular, a provisioning request comprising a virtual machine designation of a virtual machine and a target host designation of a target host may be received. For example, a centralized manager may receive the provisioning request from a user seeking to initialize the virtual machine on the target host. An authentication component may validate the user as having user rights to the target host. This may prevent a user from deploying virtual machines on target hosts with which the user is not authorized to use. Upon validation, the centralized manager may retrieve a virtual machine personality for the virtual machine. For example, the centralized manager may query a personality database to retrieve personality information, such as IP address, MAC address, a name of the virtual machine, and/or other information.

The centralized manager may send a provisioning job to a provisioning virtual application. The provisioning job may instruct the provisioning virtual application to initialize the virtual machine on the target host using the virtual machine personality. In one example, a virtual machine repository may comprise virtual machines having generic configurations lacking personality information (e.g., a virtual machine may merely comprise an OS, installed software, and/or minimal configuration). In particular, the virtual machines may lack customized configuration data (virtual machine personalities) that may otherwise render the virtual machines incompatible with one or more target hosts. In this way, a virtual machine within the virtual machine repository may not be locked to a specific target host and/or subnet, and thus may be initialized on a variety of target hosts due to the generic configuration.

The provisioning virtual application may retrieve the virtual machine having a generic configuration from the virtual machine repository. The provisioning virtual application may execute an initialization script upon the target host to initialize the virtual machine with the virtual machine personality. Upon receiving a confirmation from the provisioning virtual application that the initialization of the virtual machine was successful, the centralized manager may record the initialization within a teardown table, which may be used to tear down (remove) the virtual machine.

It may be appreciated that the centralized manager may be configured to receive and/or manage a plurality of provisioning requests. In particular, the centralized manager may maintain queues of provisioning jobs. In one example, a first queue may be maintained for a first provisioning virtual application, a second queue may be maintained for a second provisioning virtual application, etc. In another example, a first queue may be maintained for a first target host, a second queue may be maintained for a second target host, etc. The centralized manager may dynamically maintain the queues based upon workloads of respective provisioning virtual applications within the network computing environment. In this way, the centralized manager may perform load balancing to promote efficient distribution of provisioning jobs to the provisioning virtual applications.

It may be appreciated that the provisioning jobs may relate to RDM type, VMFS type, and/or other types of virtual machines.

Provisioning virtual applications may be located throughout the network computing environment. In one example, a target host (e.g., a controller within the network computing environment) may comprise one or more provisioning virtual applications, where the provisioning virtual applications may be configured to initialize virtual machines on the target host and/or different target hosts. It may be appreciated that the target host with which a virtual machine is to be initialized does not have to comprise the provisioning virtual application that performs the initialization.

Provisioning virtual applications may be installed throughout the network computing environment. For example, a provisioning application installer may receive a request to install a new provisioning virtual application on one or more target hosts (e.g., a controller, server, and/or other computing device within the network computing environment). It may be appreciated that a new provisioning virtual application may be installed on a target host that is or is not configured to execute virtual machines. The provisioning application installer may install the new provision virtual application on the one or more target hosts within the network computing environment. One or more records of the installation may be generated within a provisioning application lookup table, where a record may specify an association of the new provisioning virtual application and a target host on which the new provisioning virtual application was installed. In this way, the centralized manager may utilize the provisioning application lookup table to determine which provisioning virtual applications may be available to execute provisioning jobs.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 9 is an illustration of an example of a provisioning application lookup table.

DETAILED DESCRIPTION

Figure 1:
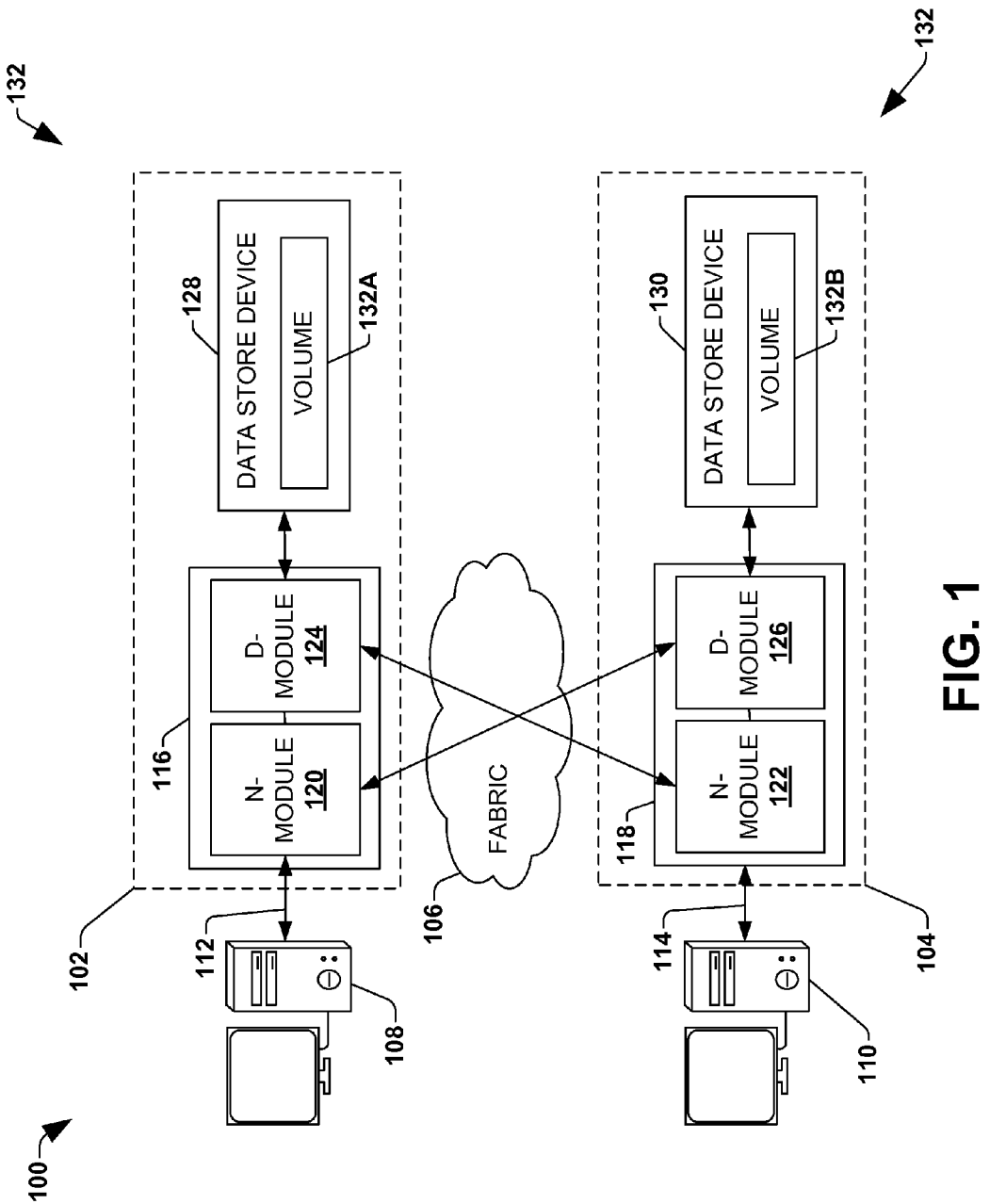
FIG. 1 is a component block diagram illustrating an example clustered network in accordance with one or more of the provisions set forth herein.

Some examples of the claimed subject matter are now described with reference to the drawings, where like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. Nothing in this detailed description is admitted as prior art.

In a multi-node, clustered data storage and management network, data can be stored in a plurality of nodes and distributed clients can be connected to the network via one of the plurality of nodes (e.g., comprising storage controllers). One or more virtual machines (VMs) can be initialized on one or more controllers throughout the cluster. In particular, a centralized manager may send provisioning jobs to provisioning virtual applications located throughout the network. A provisioning job may instruct a provisioning virtual application to initialize a virtual machine on a target host (e.g., a controller) using a virtual machine personality specified by the centralized manager.

Figure 2:
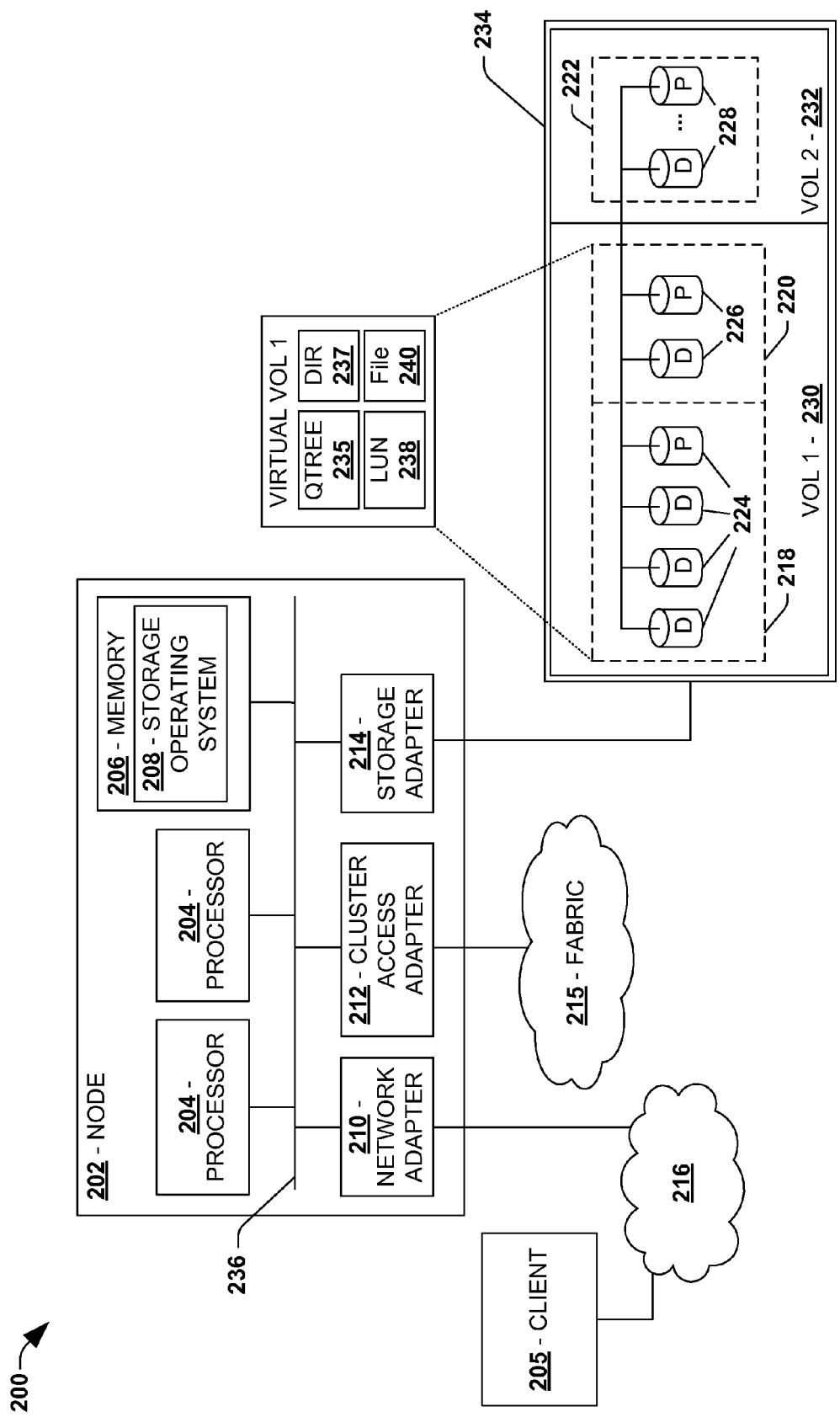
FIG. 2 is a component block diagram illustrating an example data storage system in accordance with one or more of the provisions set forth herein.

To provide a context for an embodiment of provisioning virtual machines, such as from a distributed data storage environment, FIG. 1 illustrates a clustered network environment 100, for example, whereon clients connect to a plurality of distributed nodes, and FIG. 2 illustrates an embodiment of a data storage system that may be implemented to store and manage data in this clustered network environment, including virtual machine information. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement some embodiments of the techniques and/or systems described herein. The example environment 100 comprises data storage systems 102 and 104 that are coupled over a cluster fabric 106, such as a computing network embodied as a private Infiniband or Fibre Channel (FC) network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more clients 108, 110 which may comprise, for example, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the clients 108, 110 may be general-purpose computers running applications, and may interact with the data storage systems 102, 104 using a client/server model for exchange of information. That is, the client may request data from the data storage system, and the data storage system may return results of the request to the client via one or more network connections 112, 114.

The nodes 116, 118 on clustered data storage systems 102, 104 can comprise network or host nodes that are interconnected as a cluster to provide data storage and management services, such as to an enterprise having remote locations, for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

As illustrated in the exemplary environment 100, nodes 116, 118 can comprise various functional components that coordinate to provide distributed storage architecture for the cluster. For example, the nodes can comprise a network module 120, 122 (e.g., N-Module, or N-Blade) and a data module 124, 126 (e.g., D-Module, or D-Blade). Network modules 120, 122 can be configured to allow the nodes 116, 118 to connect with clients 108, 110 over the network connections 112, 114, for example, allowing the clients 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of N and D modules, other embodiments may comprise a differing number of these modules. For example, there may be a plurality of N and/or D modules interconnected in a cluster that does not have a one-to-one correspondence between the N and D modules. That is, different nodes can have a different number of N and D modules, and the same node can have a different number of N modules than D modules.

Further, a client 108, 110 can be networked with the nodes 116, 118 in the cluster, over the networking connections 112, 114. As an example, respective clients 108, 110 that are networked to a cluster may request services (e.g., exchanging of information in the form of data packets) of a node 116, 118 in the cluster, and the node 116, 118 can return results of the requested services to the clients 108, 110. In one embodiment, the clients 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the clients 108, 110 can utilize the data storage systems 102, 104 to store and retrieve data from the volumes 132. In this embodiment, for example, the client 108 can send data packets to the N-module 120 in the node 116 within data storage system 102. The node 116 can forward the data to the data storage device 128 using the D-module 124, where the data storage device 128 comprises volume 132A. In this way, in this example, the client can access the storage volume 132A, to store and/or retrieve data, using the data storage system 102 connected by the network connection 112. Further, in this embodiment, the client 110 can exchange data with the N-module 122 in the host 118 within the data storage system 104 (e.g., which may be remote from the data storage system 102). The host 118 can forward the data to the data storage device 130 using the D-module 126, thereby accessing volume 132B associated with the data storage device 130.

In one embodiment, as illustrated by the example environment 100 of FIG. 1, a virtual machine repository, a personality database, a provisioning application lookup table, and/or a teardown table may be stored on volume 132A and/or volume 132B. In this way, a centralized manager may access volume 132A and/or volume 132B when generating provisioning jobs for provisioning virtual applications. It may be appreciated that the centralized manager and/or provisioning virtual applications may be located throughout a clustered network environment, such as environment 100, such as at clients 108 and 110, nodes 116 and 118, and/or other computing devices within the clustered network environment 100. Similarly, a provisioning virtual application may initialize virtual machines throughout the clustered network environment 100, such as at clients 108 and 110, nodes 116 and 118, and/or other target hosts or controllers within the clustered network environment 100. Additionally, a provisioning virtual application may access one or more stored versions of one or more virtual machines from volume 132A and/or volume 132B, for example, when initializing a virtual machine.

FIG. 2 is an illustrative example of a data storage system 200, providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A client 205 (e.g., 108, 110 in FIG. 1) can be connected to the node 202 over a network 216, for example, to provides access to files and/or other data stored on the data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 236. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the host 202 can to respond to client requests to manage data on the data storage device 200 (e.g., or additional clustered devices) in accordance with these client requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a client 205 over a computer network 216, which may comprise, among other things, a point-to-point connection or a shared medium, such as a local area network. The client 205 (e.g., 108, 110 of FIG. 1) may be a general-purpose computer configured to execute applications. As described above, the client 205 may interact with the data storage system 200 in accordance with a client/host model of information delivery.

The storage adapter 214 cooperates with the operating system 208 executing on the host 202 to access information requested by the client 205. The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can includes input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 236 to the network adapter 210 (and/or the cluster access adapter 212 if sending to another node in the cluster) where the information is formatted into a data packet and returned to the client 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, such as data (D) and/or parity (P), whereas the directory may be implemented as a specially formatted file in which other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume, which may also be referred to as a "traditional volume" in some contexts, corresponds to at least a portion of physical memory whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical memory locations, such as some available space from each of the disks 224, 226, 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 237, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent each volume stored on a data storage device, a target address on the data storage device can be used to identify one or more LUNs 238. Thus, for example, when the host 202 connects to a volume 230, 232 through the storage adapter 214, a connection between the host 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

Figure 3:
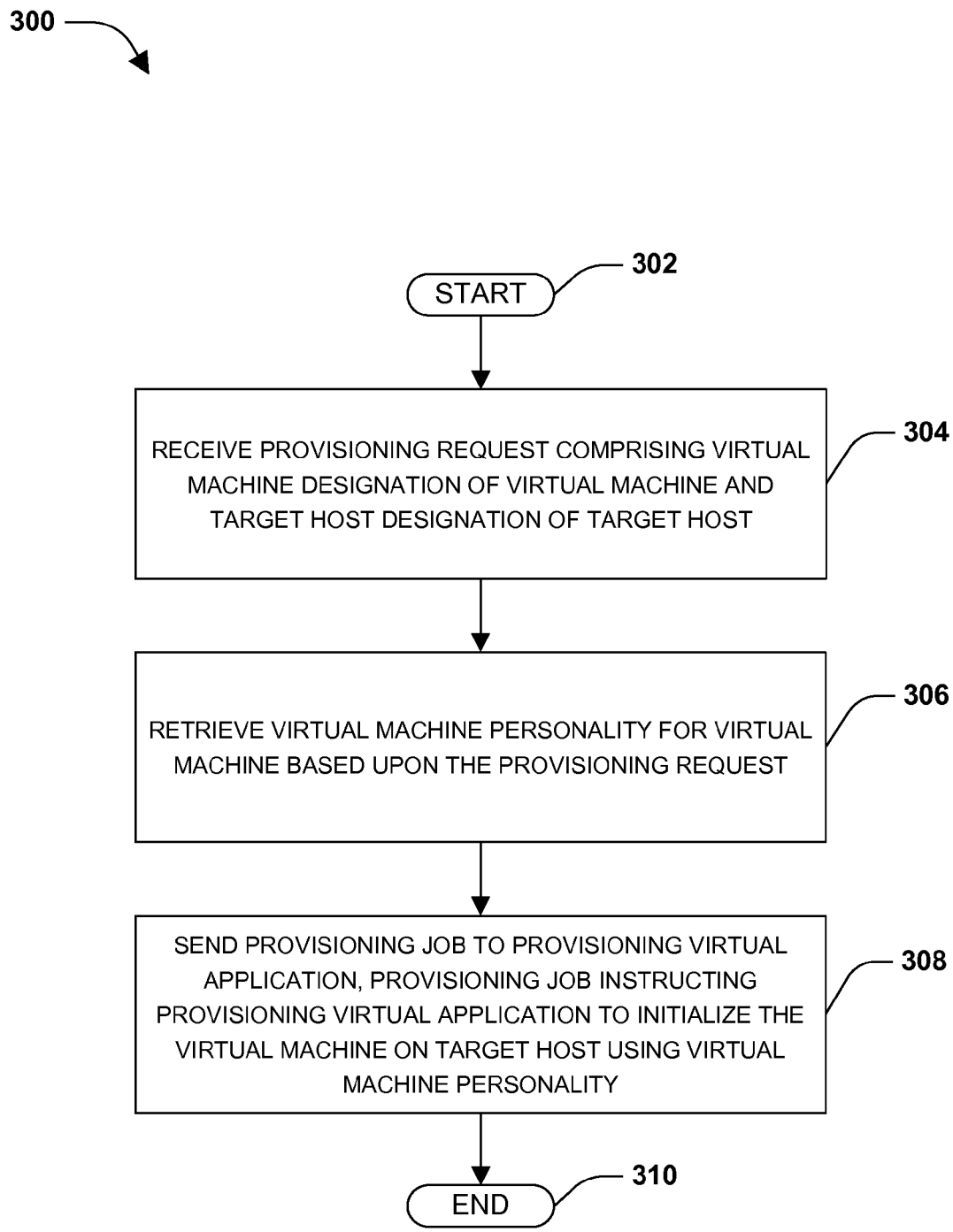
FIG. 3 is a flow chart illustrating an exemplary method of provisioning a virtual machine.

One embodiment of provisioning a virtual machine is illustrated by an exemplary method 300 in FIG. 3. At 302, the method starts. At 304, a provisioning request comprising a virtual machine designation of a virtual machine and a target host designation of a target host may be received. The virtual machine may be configured as a raw device mapping (RDM) type, virtual machine file system (VMFS) type, and/or any other type of virtual machine. In one example, the provisioning request may be received from a user seeking to initialize the virtual machine on the target host. The user may be validated as having user rights to the target host. This may prevent a user from deploying virtual machines on target hosts with which the user is not authorized to use.

At 306, a virtual machine personality may be retrieved for the virtual machine based upon the provisioning request. In one example, a personality database may be consulted to retrieve the virtual machine personality using the virtual machine designation, the target host designation, and/or other criteria. The virtual machine personality may comprise a MAC address, an IP address, a name of the virtual machine, and/or other configuration data that may be used in initializing the virtual machine on the target host. It may be appreciated that the virtual machine personality may be retrieved because the virtual machine may be stored in a virtual machine repository in a generic state, where the virtual machine may merely comprise installed software with minimal configuration. That is, the virtual machine may lack customized configuration data (virtual machine personality) that may otherwise render the virtual machine incompatible with one or more target hosts (e.g., the virtual machine does not comprise an IP address or MAC address because such configuration may render the virtual machine inoperable on particular target hosts using different networking configurations). In another example, the virtual machine personality may be retrieved for the virtual machine based at least in part upon the provisioning request and/or some or no additional criteria. That is, the virtual machine personality may be retrieved with merely the provisioning request and no additional criteria and/or the virtual machine personality may be retrieved based upon the provisioning request along with additional criteria.

At 308, a provisioning job may be sent to a provisioning virtual application. The provisioning job may instruct the provisioning virtual application to initialize the virtual machine on the target host using the virtual machine personality. It may be appreciated that the provisioning virtual application may be located on the target host or at a location different than the target host, such as a different controller.

The provisioning virtual application may retrieve the virtual machine from a virtual machine repository. The provisioning virtual application may execute an initialization script upon the target host to initialize the virtual machine with the virtual machine personality. Upon initialization, the provisioning virtual application may return a confirmation. The confirmation may comprise a name of the initialized virtual machine, a name of the host comprising the initialized virtual machine, an IP address corresponding to the initialized virtual machine, confirmation that the provisioning job completed successfully, and/or other information relating to the virtual machine and/or target host. Upon receiving the confirmation providing notification that the provisioning job completed successfully, a record specifying the initialization of the virtual machine on the target host may be generated. For example, a record may be generated within a teardown table. The record may specify the initialization of the virtual machine on the target host.

It may be appreciated that a plurality of provisioning requests may be received and/or managed. Additionally, a network computing environment may comprise a plurality of provisioning virtual applications. In one example a first provisioning virtual application may be located within a first host and a second provisioning virtual application may be located within a second host, where the first and second host may be the same or different hosts. It may be appreciated that a target host may comprise one or more provisioning virtual applications.

One or more queues comprising provisioning jobs for provisioning virtual applications may be maintained (e.g., queues for respective provisioning virtual applications, queues for respective target hosts, etc.). Provisioning jobs may be dynamically managed within the queues based upon workloads of respective provisioning virtual applications. In one example, a plurality of provisioning requests comprising respective virtual machine designations and target host designations may be received. For example, a user may specify a batch of virtual machines to initialize. Virtual machine personalities for the respective virtual machines may be retrieved. Provisioning jobs for one or more provisioning virtual applications may be generated based upon the plurality of provisioning requests and retrieved virtual machine personalities. One or more provisioning jobs may be sent to one or more provisioning virtual applications, while one or more provisioning jobs may be queued up in one or more queues.

In one example, provisioning jobs 1, 2, 3, 4, 5, 6, and 7 may be generated. Provisioning virtual applications A, B, and C may be available to perform the provisioning jobs. Provisioning job 1 may be sent to provisioning virtual application A, provisioning job 2 may be sent to provisioning virtual application B, and provisioning job 3 may be sent to provisioning virtual application C. Provisioning job 4 and 5 may be queued up in queue A corresponding to provisioning virtual application A. Provisioning job 6 may be queued up in queue B corresponding to provisioning virtual application B. Provisioning job 7 may be queued up in queue C corresponding to provisioning virtual application C. The queued up jobs may be reallocated dynamically based upon workloads of provisioning virtual applications A, B, and C.

In one example, a first queue may correspond to a first provisioning virtual application and a second queue may correspond to a second provisioning virtual application. The first queue may comprise one or more provisioning jobs assigned to the first provisioning virtual application. The second queue may comprise one or more provisioning jobs assigned to the second provisioning virtual application. A first provisioning job may be sent from the first queue to the first provisioning virtual application. A second provisioning job may be set from the second queue to the second provisioning virtual application. Upon receiving notification that the first provisioning job is complete, a third provisioning job from within the first queue may be sent to the first provisioning virtual application. In this way, the provisioning of virtual machines may be distributed amongst provisioning virtual applications located throughout a network computing environment regardless of whether the virtual machines are configured as RDM, VMFS, and/or other virtual machine types.

Provisioning virtual applications may be installed on controllers (e.g., a target host, a server, a personal computing device, etc.) within the network computing environment. In one example, a request to install a new provisioning virtual application on one or more target hosts may be received. The new provisioning virtual application may be installed on the one or more target hosts. One or more records specifying the associations of the new provisioning virtual application with the one or more target hosts may be generated, for example, within a provisioning application lookup table. The provisioning application lookup table may be used to determine available provisioning virtual applications that may be configured to perform provisioning jobs. At 310, the method ends.

Figure 4:
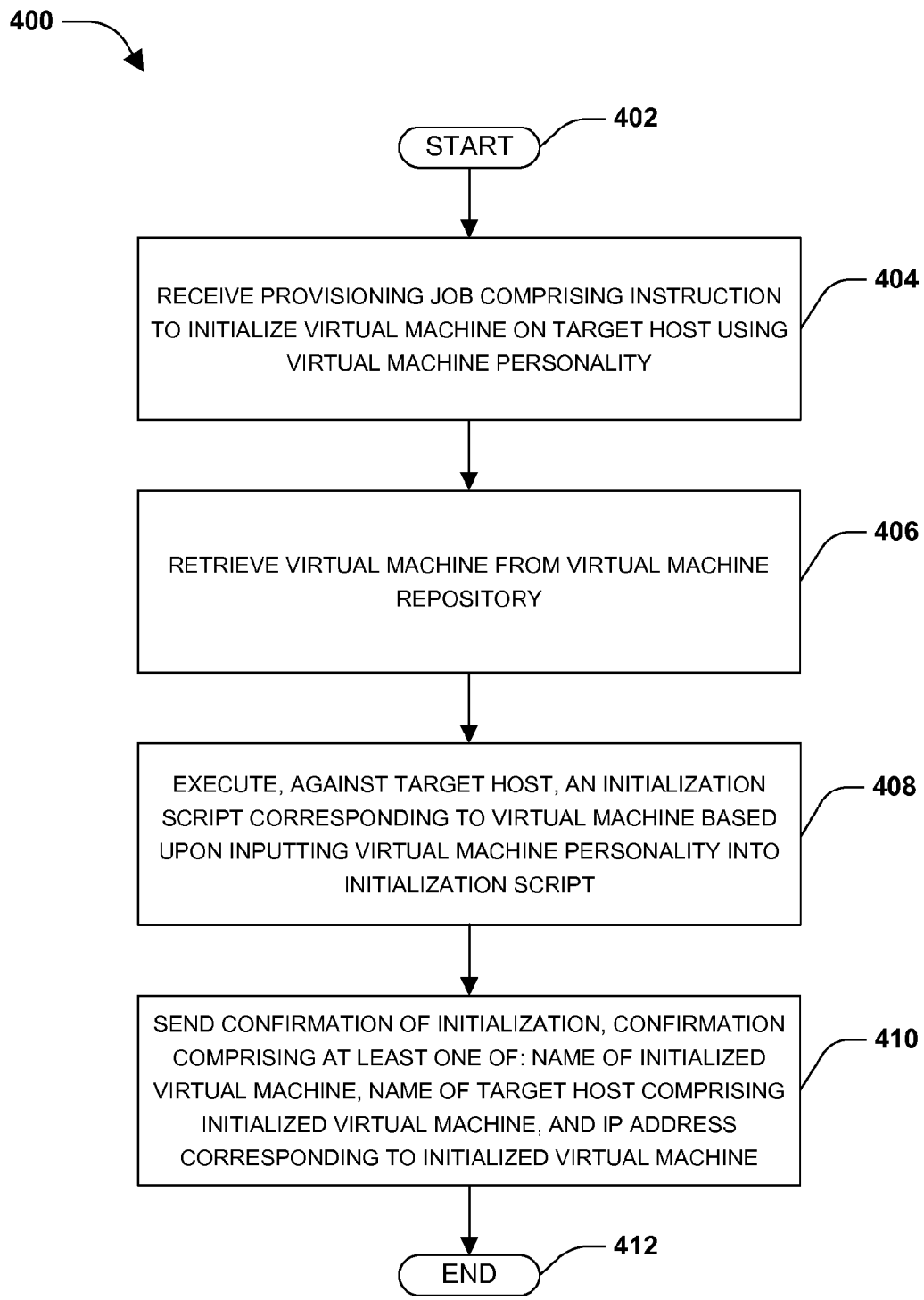
FIG. 4 is a flow chart illustrating an exemplary method of provisioning a virtual machine.

One embodiment of provisioning a virtual machine is illustrated by an exemplary method 400 in FIG. 4. At 402, the method starts. At 404, a provisioning job comprising an instruction to initialize a virtual machine on a target host using a virtual machine personality may be received. In one example, a provisioning virtual application may receive the provisioning job from a centralized manger. The provisioning virtual application and/or the target host may be located within a network computing environment (e.g., the provisioning virtual application may be located on the target host or on a target host controller different than the target host). At 406, the virtual machine may be retrieved from a virtual machine repository. In one example, the virtual machine repository may comprise a plurality of virtual machines with minimal configuration. That is, the virtual machines may comprise operating systems, software, and/or minimal configuration data, but may lack personality data, such as IP address, MAC address, virtual machine name, etc.

At 408, an initialization script corresponding to the virtual machine may be executed against the target host. The virtual machine personality may be inputted into the initialization script. In this way, the virtual machine may be configured and initialized on the target host. At 410, a confirmation of the initialization may be sent, for example, to the centralized manager. The confirmation may comprise a name of the initialized virtual machine, a name of a host comprising the initialized virtual machine, an IP address corresponding to the initialized virtual machine, etc. At 412, the method ends.

Figure 5:
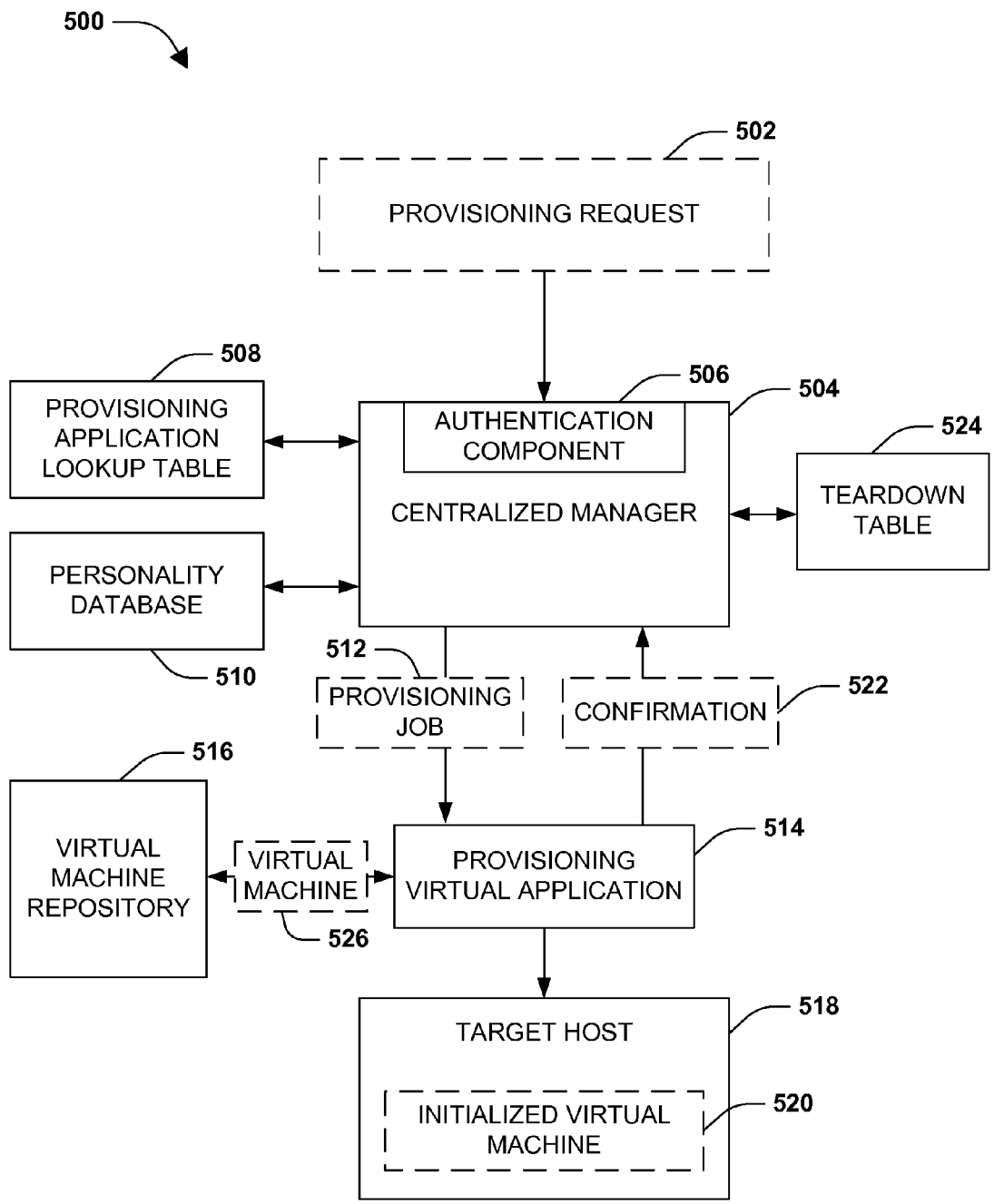
FIG. 5 is a component block diagram illustrating an exemplary system for provisioning a virtual machine.

FIG. 5 illustrates an example of a system 500 configured to provision a virtual machine. The system 500 may comprise a centralized manager 504. The centralized manager 504 may comprise an authentication component 506. The centralized manager 504 may be configured to receive a provisioning request 502 to initialize a virtual machine 526 (e.g., an RDM type virtual machine) on a target host 518. In one example, the authentication component 506 may validate a user originating the provisioning request 502 as having user rights to the target host 518.

The centralized manager 504 may be configured to retrieve a virtual machine personality for the virtual machine 526 based at least in part upon the provisioning request 502 (e.g., the provisioning request with or without additional criteria). For example, the centralized manager 504 may retrieve the virtual machine personality from a personality database 510 based upon a virtual machine designation, a target host designation, and/or other data specified within the provisioning request 502. The virtual machine personality may comprise a MAC address, an IP address, a name of the virtual machine, and/or other configuration data. The centralized manager 504 may maintain the personality database 510 comprising a plurality of virtual machine personalities.

The centralized manager 504 may be configured to send a provisioning job 512 to a provisioning virtual application 514. The provisioning job 512 may instruct the provisioning virtual application 514 to initialize the virtual machine 526 on the target host 518 using the virtual machine personality (e.g., initialized virtual machine 520). In one example, the centralized manager 504 may maintain a provisioning application lookup table 508 comprising available provisioning virtual application information (e.g., a record may comprise a provisioning virtual application matched with a target host on which the provisioning virtual application is installed). The centralized manager 504 may select the provisioning virtual application 514 as a recipient of the provisioning job 512 based upon the provisioning virtual application 514 corresponding to the target host 518 within the provisioning application lookup table 508, for example.

The centralized manager 504 may receive a confirmation 522 comprising notification that the provisioning job 512 completed successfully. The centralized manager 504 may generate a record within a teardown table 524. The record may specify the initialization of the virtual machine 526 on the target host 518 (initialized virtual machine 520). The teardown table 524 may be used to track and/or remove virtual machines.

In one example, the centralized manager 504, the provisioning virtual application 514, and/or the target host 518 may be located at various locations throughout a clustered network environment, such as at clients 108, 110 and/or nodes 116, 118 of FIG. 1 and/or at client 205 and/or node 202 of FIG. 2, for example. It may be appreciated that the centralized manager 504, provisioning virtual application 514, and/or the target host 518 may be located on similar or different nodes or clients. Additionally, the provisioning application lookup table 508, the personality database 510, the teardown table 524, and/or the virtual machine repository 516 may be located at various locations throughout a clustered network environment, such as at volume 132A, 132B within respective data storage devices 128, 130 of FIG. 1 and/or volume 230, 232 within data storage device 234 of FIG. 2, for example. It may be appreciated that the provisioning application lookup table 508, the personality database 510, the teardown table 524, and/or the virtual machine repository 516 may be located on similar or different volumes and/or data storage devices.

Figure 6:
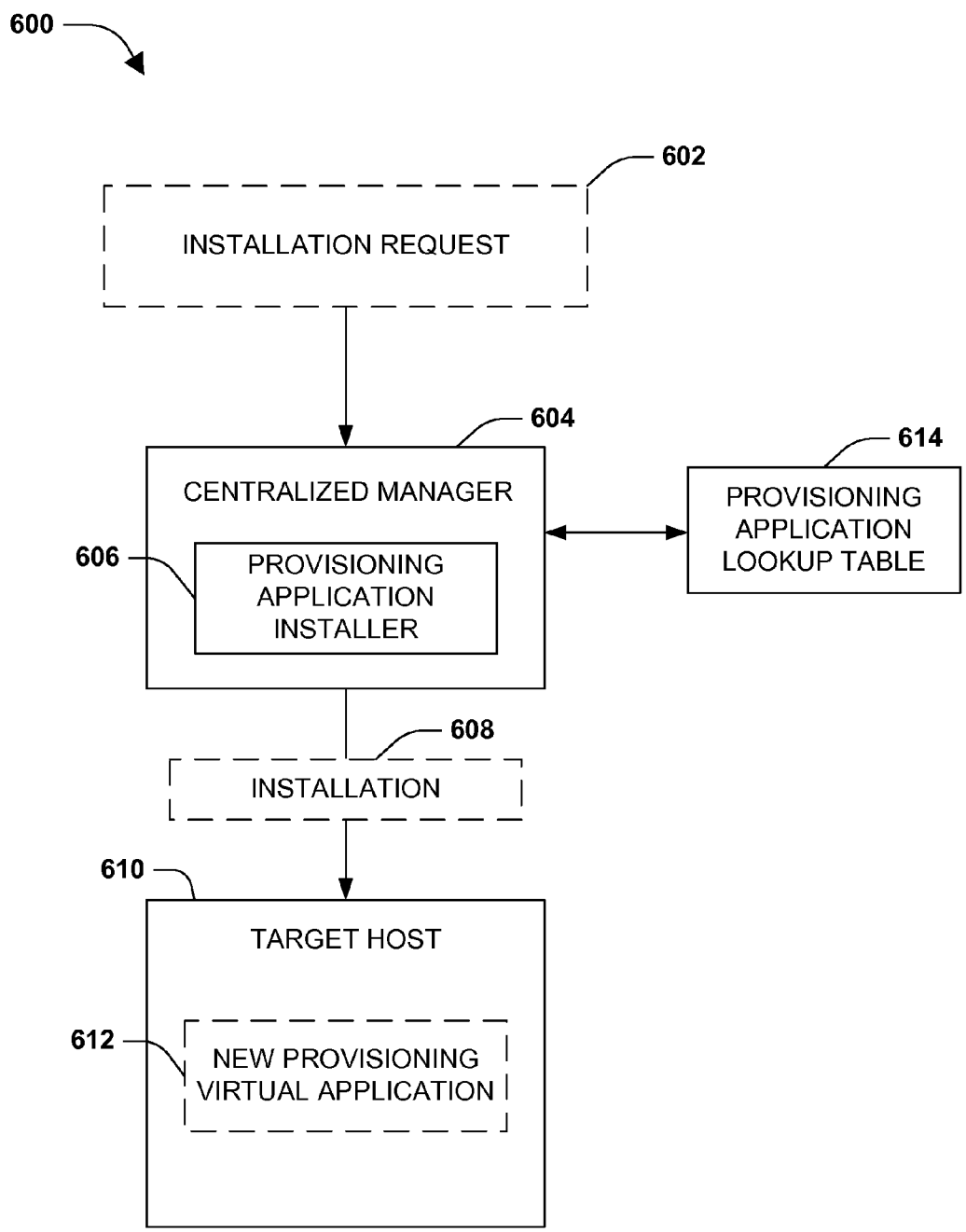
FIG. 6 is a component block diagram illustrating an exemplary system for provisioning a virtual machine.

FIG. 6 illustrates an example of a system 600 configured to provision a virtual machine. The system 600 may comprise a centralized manager 604. The centralized manager 604 may comprise a provisioning application installer 606. The provisioning application installer 606 may be configured to receive an installation request 602 to install a new provisioning virtual application 612 on one or more target hosts (e.g., target host 610). The provisioning application installer 606 may install (e.g., installation 608) the new provisioning virtual application 612 on the target host 610. Upon successful installation 608 of the provisioning virtual application 612, the provisioning application installer 606 may generate a record within a provisioning application lookup table 614. The record may specify an association of the new provisioning virtual application 612 and the target host 610.

In one example, the centralized manager 604, the new provisioning virtual application 612, and/or the target host 610 may be located at various locations throughout a clustered network environment, such as at clients 108, 110 and/or nodes 116, 118 of FIG. 1 and/or at client 205 and/or node 202 of FIG. 2, for example. It may be appreciated that the centralized manager 604, the new provisioning virtual application 612, and/or the target host 610 may be located on similar or different nodes or clients. Additionally, the provisioning application lookup table 614 may be located at various locations through the clustered network environment, such as at volume 132A, 132B within respective data storage devices 128, 130 of FIG. 1 and/or volume 230, 232 within data storage device 234 of FIG. 2, for example.

Figure 7:
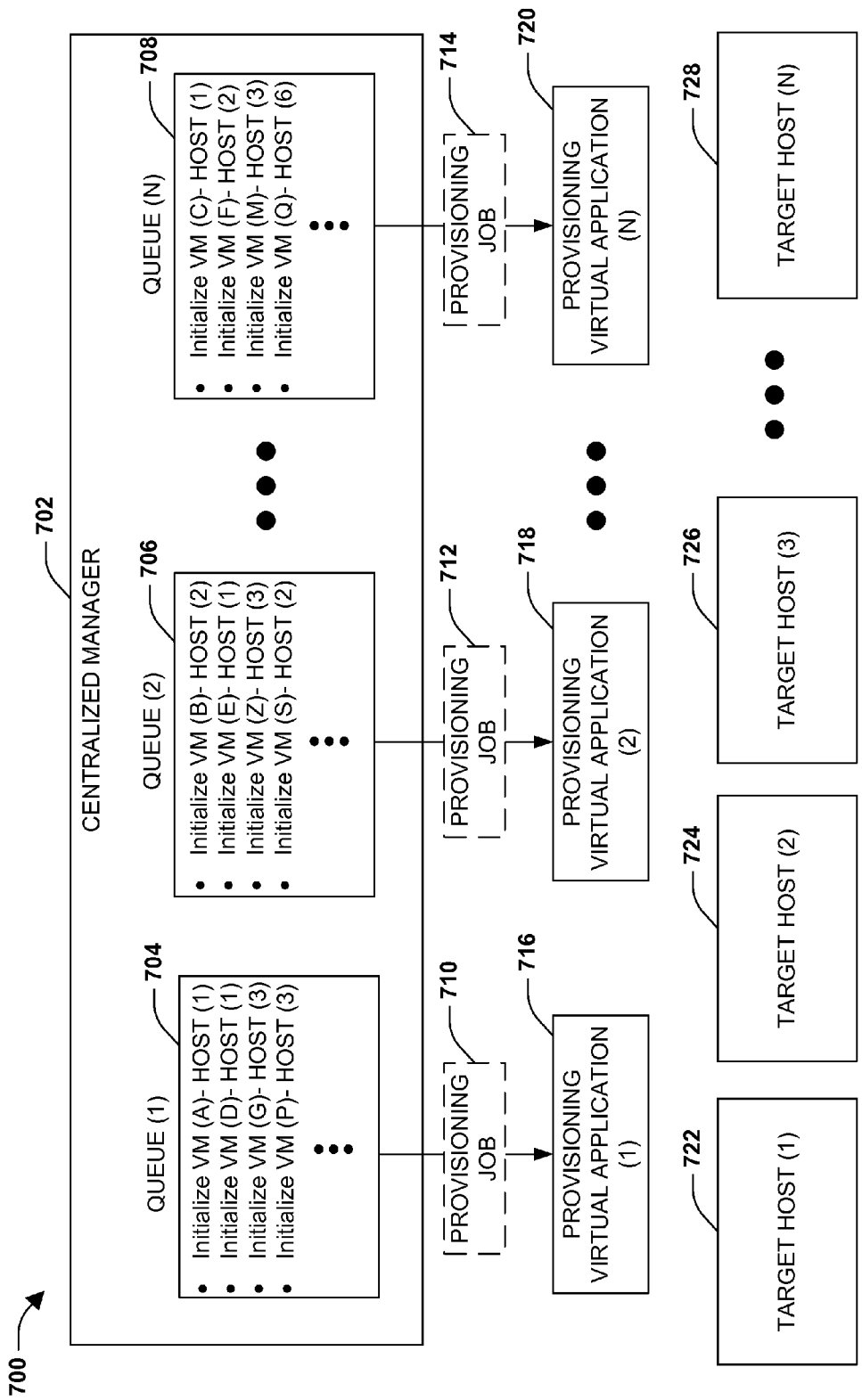
FIG. 7 is an illustration of an example of a centralized manager managing a plurality of queues comprising provisioning jobs for provisioning virtual applications.

FIG. 7 illustrates an example 700 of a centralized manager 702 managing a plurality of queues comprising provisioning jobs for provisioning virtual applications. The centralized manager 702 may be configured to receive and manage a plurality of provisioning requests to initialize virtual machines on target hosts. The centralized manager 702 may generate and/or queue provisioning jobs based upon the provisioning requests. In one example, a provisioning virtual application may be configured to handle one provisioning job at a time (serially). Thus, the centralized manager 702 may maintain queues for the provisioning virtual application so that provisioning jobs may be sent serially to the provisioning virtual application. The centralized manager 702 may be configured to dynamically allocate provisioning jobs across the queues based upon workloads of the respective provisioning virtual applications. For example, provisioning jobs may be reassigned amongst the queues in attempt to increase processing efficiency of the provisioning jobs.

In one example, the centralized manager 702 may maintain a queue (1) 704 comprising provisioning jobs for provisioning virtual application (1) 716, queue (2) 706 comprising provisioning jobs for provisioning virtual application (2) 718, and/or other queues such as queue (N) 708 comprising provisioning jobs for provisioning virtual application (N) 720. The centralized manager 702 may send provisioning jobs (e.g., provisioning job 710, provisioning job 712, and/or other provisioning jobs such as provisioning job 714) to respective provisioning virtual applications. The provisioning virtual applications may initialize virtual machines on target hosts (e.g., target host (1) 722, target host (2) 724, target host (3) 726, and/or other target hosts such as target host (N) 728) based upon the provisioning jobs. Should a queue for a first provisioning virtual application become empty, while a queue for a second provisioning virtual application remains far from empty, where the first provisioning virtual application can perform provisioning jobs queued up in the queue for the second provisioning virtual application (e.g., both the first and second provisioning virtual applications are associated with the same target host), the centralized manager, for example, can thus (re)allocate some provisioning jobs from the queue for the second provisioning virtual application to the queue for the first provisioning virtual application to balance the workload. In this way, the workload of processing the provisioning jobs may be distributed amongst provisioning virtual applications throughout a network computing environment, as opposed to performing all of the processing at the centralized manager 702.

Figures 8A, 8B:
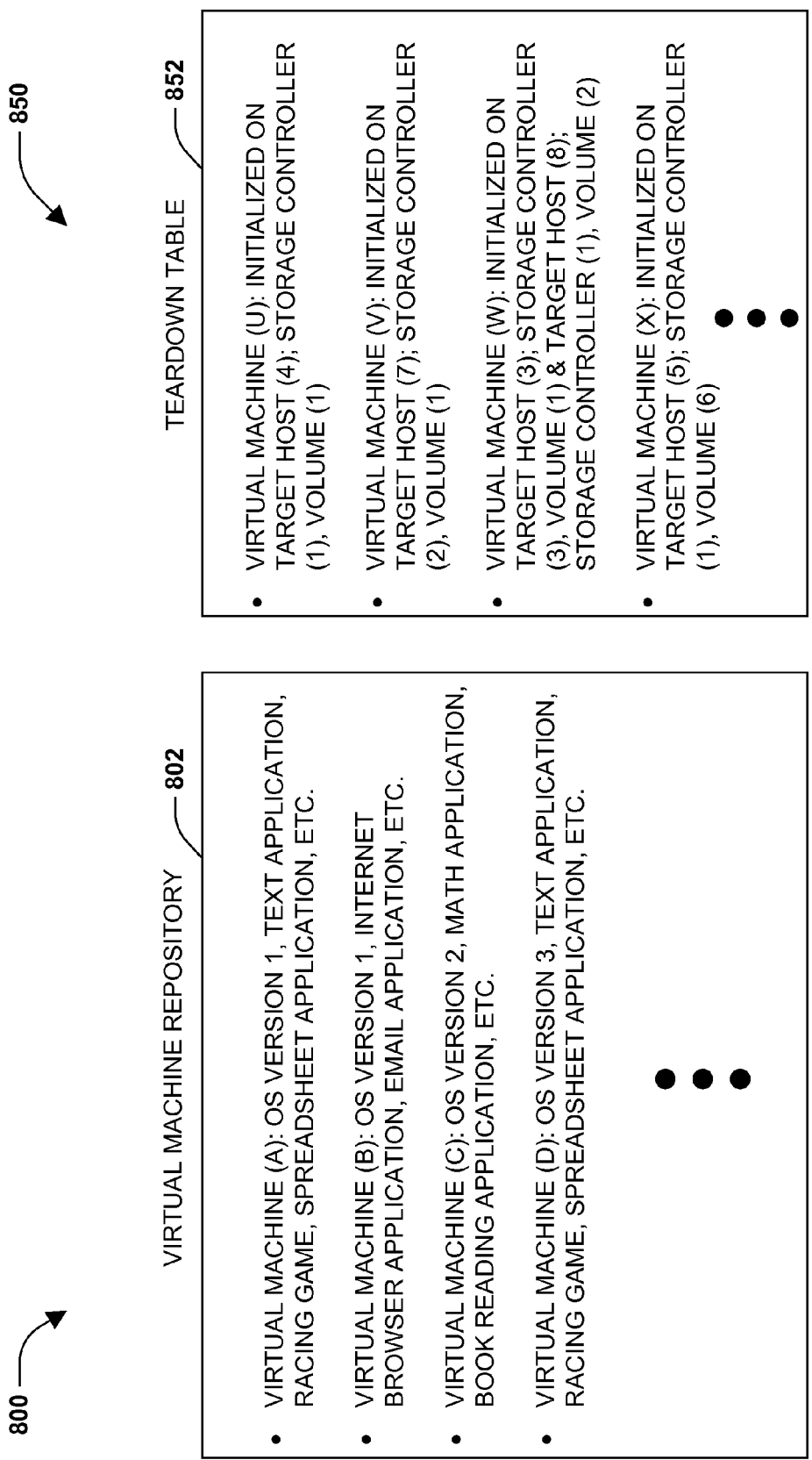
FIG. 8A is an illustration of an example of a virtual machine repository.
FIG. 8B is an illustration of an example of a teardown table.

FIG. 8A illustrates an example 800 of a virtual machine repository 802. The virtual machine repository 802 may comprise virtual machines with minimal configuration. That is, a virtual machine may comprise an operating system, software applications, and/or minimal configuration data. However, the virtual machine may lack a personality (e.g., MAC address, IP address, a virtual machine name, etc.). In this way, the virtual machine is not locked to a specific target host and/or subnet, and thus may be initialized on a variety of target hosts due to the generic configuration. For example, virtual machine (A) may comprise operating system 1, a text application, a racing game, a spreadsheet application, and/or other minimal configuration data. The virtual machine (A) may comprise minimal configuration such that virtual machine (A) may be compatible with a variety of target hosts within a network computing environment. It may be appreciated that the data illustrated in the virtual machine repository 802 is merely one example of how data may be stored within a virtual machine repository 802.

FIG. 8B illustrates an example 850 of a teardown table 852. The teardown table 852 may comprise information relating to virtual machines initialized on target hosts. The teardown table 852 may be used to track virtual machines initialized within a network computing environment. The teardown table 852 may be used when tearing down (removing) initialized virtual machines. In one example, the teardown table 852 may comprise target host information, storage controller information, volume information, and/or other relevant information relating to initialized virtual machines. It may be appreciated that the data illustrated in the teardown table 852 is merely one example of how data may be stored within a teardown table 852.

In one example, virtual machine repository 802 and/or teardown table 852 may be located at various locations through a clustered network environment, such as at volume 132A, 132B within respective data storage devices 128, 130 of FIG. 1 and/or volume 230, 232 within data storage device 234 of FIG. 2, for example. It may be appreciated that the virtual machine repository 802 and/or teardown table 852 may be located on similar or different volumes and/or data storage devices.

FIG. 9 illustrates an example 900 of a provisioning application lookup table 902. The provisioning application lookup table 902 may comprise available provisioning virtual application information. The available provisioning virtual application information may specify information relating to installed provisioning virtual applications, target hosts on which provisioning virtual applications are installed, and/or other information relating to provisioning virtual applications. A centralized manager may select a provisioning virtual application as a recipient of a provisioning job based upon the provisioning virtual application corresponding to a target host within the provisioning application lookup table 902. Additionally, a provisioning application installer may generate records within the provisioning application lookup table 902, where a record may comprise information relating to a newly installed provisioning virtual application. It may be appreciated that the data illustrated in the provisioning application lookup table 902 is merely one example of how data may be stored within a provisioning application lookup table 902.

In one example, provisioning application lookup table 902 may be located at various locations through a clustered network environment, such as at volume 132A, 132B within respective data storage devices 128, 130 of FIG. 1 and/or volume 230, 232 within data storage device 234 of FIG. 2, for example.

Figure 10:
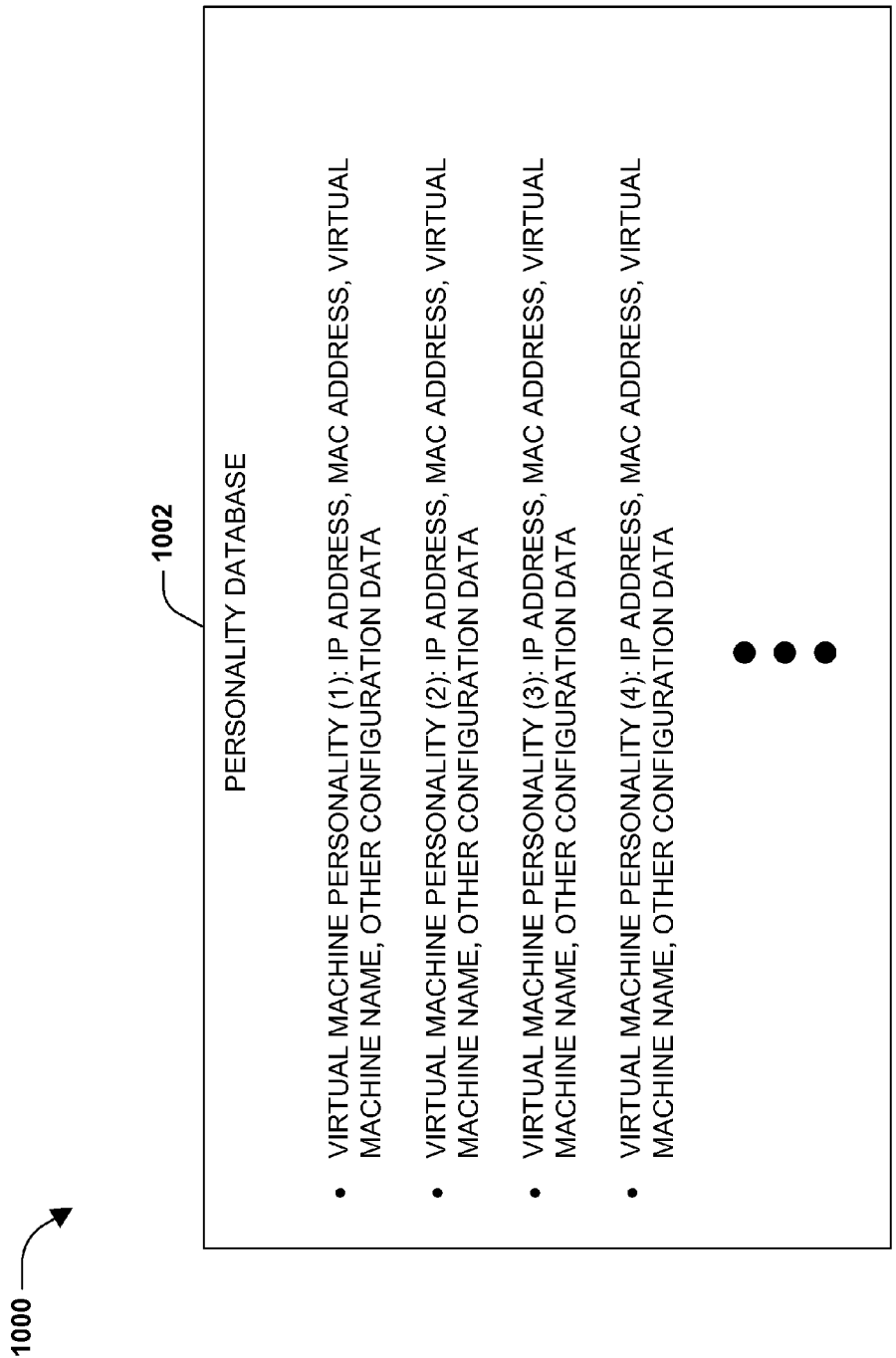
FIG. 10 is an illustration of an example of a personality database.

FIG. 10 illustrates an example 1000 of a personality database 1002. The personality database 1002 may comprise virtual machine personalities. A virtual machine personality may comprise an IP address, a MAC address, a virtual machine name, and/or other configuration data (e.g., a preferred target host, a preferred subnet, etc.). A centralized manager may retrieve a virtual machine personality for a virtual machine from the personality database 1002 in response to a request to initialize the virtual machine on a target host. A provisioning job comprising the virtual machine personality may be sent to a provisioning virtual application. The provisioning virtual application may initialize the virtual machine on the target host using the virtual machine personality. It may be appreciated that the data illustrated in the personality database 1002 is merely one example of how data may be stored within a personality database 1002.

In one example, personality database 1002 may be located at various locations through the clustered network environment, such as at volume 132A, 132B within respective data storage devices 128, 130 of FIG. 1 and/or volume 230, 232 within data storage device 234 of FIG. 2, for example.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data. Computer readable media may also comprise communication media, which typically embodies computer readable instructions or other data in a modulated data signal such as a carrier wave or other transport mechanism (e.g., that has one or more of its characteristics set or changed in such a manner as to encode information in the signal). The computer readable medium can also be distributed (e.g., using a switching fabric, such as used in computer farms) over a network-coupled computer system so that computer readable code is stored and executed in a distributed fashion.

Figure 11:
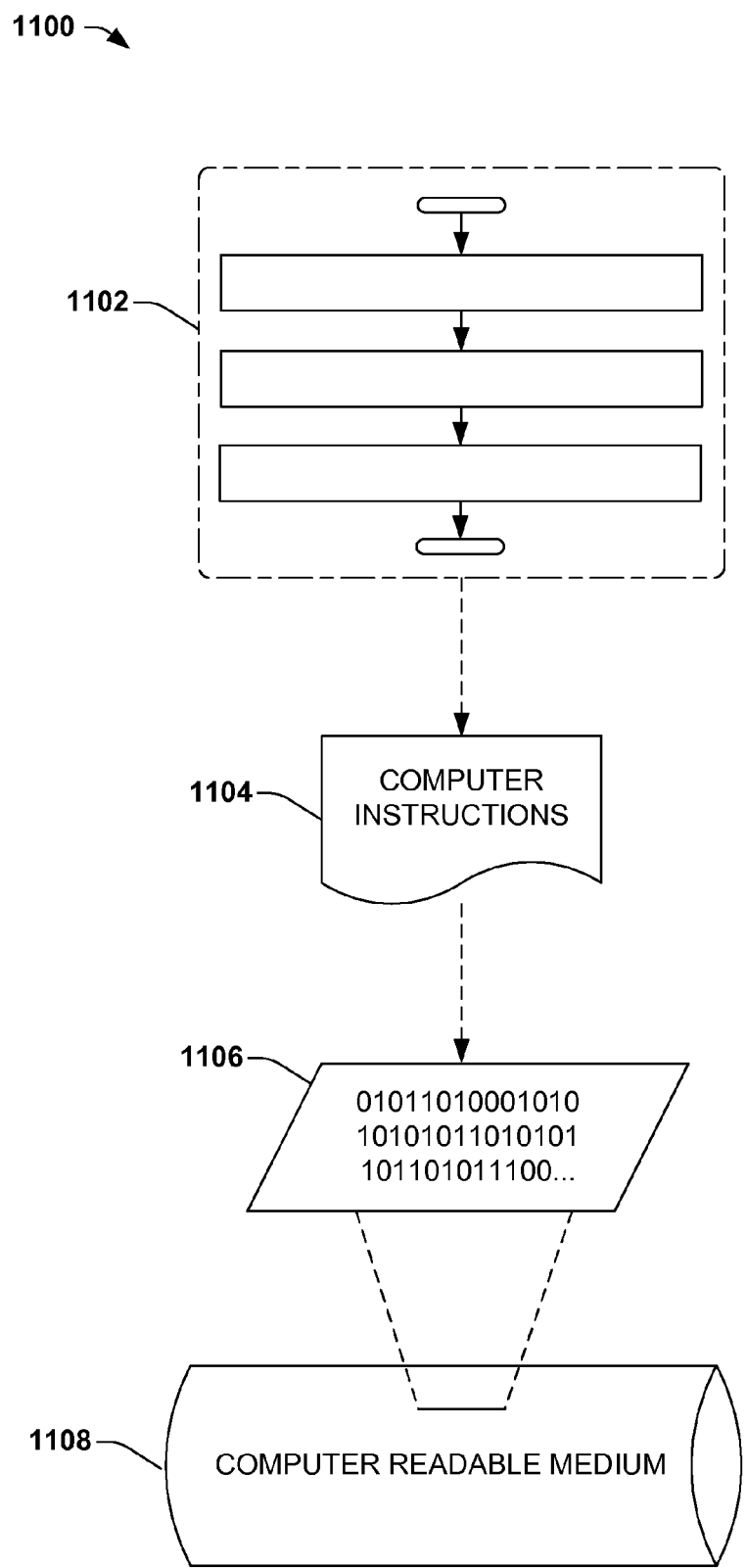
FIG. 11 is an example of a computer readable medium in accordance with one or more of the provisions set forth herein.

Another embodiment (which may include one or more of the variations described above) involves a computer-readable medium comprising processor-executable instructions configured to apply one or more of the techniques presented herein. An exemplary computer-readable medium that may be devised in these ways is illustrated in FIG. 11, where the implementation 1100 comprises a computer-readable medium 1108 (e.g., a CD-R, DVD-R, platter of a hard disk drive, flash drive, etc.), on which is encoded computer-readable data 1106. This computer-readable data 1106 in turn comprises a set of computer instructions 1104 configured to operate according to the principles set forth herein. In one such embodiment, the processor-executable instructions 1104 may be configured to perform a method 1102, such as at least some of the method 300 of FIG. 3 or method 400 of FIG. 4, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as may be used herein is intended to encompass a computer program accessible from any computer-readable device, carrier, or media. Of course, those skilled in the art will recognize many modifications may be made to this configuration without departing from the scope or spirit of the claimed subject matter.

It will be appreciated that the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. Also as used herein, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used herein, including the appended claims, may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure is intended to include such modifications and alterations. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and/or advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for initializing a virtual machine on a target host according to virtual machine characteristics, comprising:
   receiving a request for a provisioning job, the request comprising a virtual machine designation that identifies a virtual machine and a target host designation that identifies a target host out of a plurality of hosts as corresponding to a host within which the virtual machine is to be initialized according to virtual machine characteristics;
   retrieving the virtual machine characteristics for the virtual machine based upon the request;
   querying a provisioning application lookup structure to identify an entry comprising a mapping of the target host to a provisioning virtual application comprised within the target host, the provisioning application lookup structure comprising one or more entries mapping respective hosts within the plurality of hosts to one or more provisioning virtual applications; and
   sending the provisioning job to the provisioning virtual application comprised within the target host, the provisioning job instructing the provisioning virtual application to initialize the virtual machine on the target host using the virtual machine characteristics.

2. The method of claim 1, the virtual machine comprising at least one of an RDM type virtual machine or a VMFS type virtual machine.

3. The method of claim 1, comprising:
   receiving a plurality of requests, associated with one or more of the plurality of hosts, comprising respective virtual machine designations and target host designations; and
   retrieving respective virtual machine characteristics for designated virtual machines.

4. The method of claim 1, comprising:
   sending a first provisioning job from a first queue to a first provisioning virtual application and a second provisioning job from a second queue to a second provisioning virtual application, the first queue comprising one or more provisioning jobs assigned to the first provisioning virtual application and the second queue comprising one or more provisioning jobs assigned to the second provisioning virtual application.

5. The method of claim 4, comprising:
the first provisioning application located within a first virtualization host and the second provisioning application located within a second virtualization host.

6. The method of claim 1, comprising:
queuing a first provisioning job and a second provisioning job for the provisioning virtual application;
sending the first provisioning job to the provisioning virtual application; and
upon receiving notification that the first provisioning job is complete, sending the second provisioning job to the provisioning virtual application.

7. The method of claim 1, comprising:
receiving notification that the provisioning job completed successfully; and
generating a record specifying the initialization of the virtual machine on the target host.

8. The method of claim 1, comprising:
validating a user originating the request as having user rights to the target host.

9. The method of claim 1, comprising:
receiving a request to install a new provisioning virtual application on one or more target hosts;
generating a record specifying associations of the new provisioning virtual application with the one or more target hosts; and
installing the new provisioning virtual application on the one or more target hosts.

10. The method of claim 1, the virtual machine characteristics comprising at least one of a MAC address, an IP address, or a name of the virtual machine.

11. A system for initializing a virtual machine on a target host according to virtual machine characteristics, comprising:
a centralized manager configured to:
receive a request for a provisioning job, the request comprising a virtual machine designation that identifies a virtual machine and a target host designation that identifies a target host out of a plurality of hosts as corresponding to a host within which the virtual machine is to be initialized according to virtual machine characteristics;
retrieve the virtual machine characteristics for the virtual machine based upon the request;
query a provisioning application lookup structure to identify an entry comprising a mapping of the target host to a provisioning virtual application comprised within the target host, the provisioning application lookup structure comprising one or more entries mapping respective hosts within the plurality of hosts to one or more provisioning virtual applications; and
send the provisioning job to the provisioning virtual application comprised within the target host, the provisioning job instructing the provisioning virtual application to initialize the virtual machine on the target host using the virtual machine characteristics.

12. The system of claim 11, the centralized manager configured to:
send a first provisioning job from a first queue to a first provisioning virtual application and a second provisioning job from a second queue to a second provisioning virtual application, the first queue comprising one or more provisioning jobs assigned to the first provisioning virtual application and the second queue comprising one or more provisioning jobs assigned to the second provisioning virtual application.

13. The system of claim 11, the centralized manager configured to:
maintain a queue comprising one or more provisioning jobs for a first provisioning virtual application based upon work loads of respective provisioning virtual applications associated with the target host.

14. The system of claim 11, the centralized manager configured to:
maintain:
a characteristics database comprising virtual machine characteristics.

15. The system of claim 11, the virtual machine comprising a RDM type virtual machine.

16. The system of claim 14, the centralized manager comprising:
a provisioning application installer configured to:
receive a request to install a new provisioning virtual application on one or more target hosts;
install the new provisioning virtual application on a first target host of the one or more target hosts; and
generate a first entry within the provisioning application lookup structure, the first entry mapping the first target host to the new provisioning virtual application installed within the first target host.

17. The system of claim 11, the centralized manager configured to:
upon receiving a notification that the provisioning job completed successfully, generate a record within a teardown table, the record specifying an initialization of the virtual machine on the target host.

18. The system of claim 11, the centralized manager comprising:
an authentication component configured to:
validate a user originating the request as having user rights to the target host.

19. The system of claim 11, a virtual machine characteristic comprising at least one of a MAC address, an IP address, or a name of the virtual machine.

20. A non-transient computer-readable medium comprising processor-executable instructions that when executed perform a method for initializing a virtual machine on a target host according to virtual machine characteristics comprising:
receiving a request for a provisioning job, the request comprising a virtual machine designation that identifies a virtual machine and a target host designation that identifies a target host out of a plurality of hosts as corresponding to a host within which the virtual machine is to be initialized according to virtual machine characteristics;
retrieving the virtual machine characteristics for the virtual machine based upon the provisioning request;
querying a provisioning application lookup structure to identify an entry comprising a mapping of the target host to a provisioning virtual application comprised within the target host, the provisioning application lookup structure comprising one or more entries mapping respective hosts within the plurality of hosts to one or more provisioning virtual applications; and
sending the provisioning job to the provisioning virtual application comprised within the target host, the provisioning job instructing the provisioning virtual application to initialize the virtual machine on the target host using the virtual machine characteristics.

\* \* \* \* \*